United States Patent [19]
Knowlton

[11] 3,879,722

[45] Apr. 22, 1975

[54] INTERACTIVE INPUT-OUTPUT COMPUTER TERMINAL WITH AUTOMATIC RELABELING OF KEYBOARD

[75] Inventor: Kenneth Charles Knowlton, Plainfield, N.J.

[73] Assignee: Bell Telephone Laboratories, Incorporated, Murray Hill, Berkeley Heights, N.J.

[22] Filed: Dec. 10, 1973

[21] Appl. No.: 422,995

[52] U.S. Cl. ........ 340/324 R; 178/17 R; 340/365 R

[51] Int. Cl. ........ G06k 15/18

[58] Field of Search ........ 340/365, 324 AD, 324 M; 178/17

[56] References Cited

UNITED STATES PATENTS

| | | | |
|---|---|---|---|
| 3,382,588 | 5/1968 | Serrell et al. | 340/365 C |
| 3,399,401 | 8/1968 | Ellis et al. | 340/365 C |
| 3,670,322 | 6/1972 | Mallebrein | 340/365 C |
| 3,772,685 | 11/1973 | Masi | 340/365 C |

*Primary Examiner*—Marshall M. Curtis
*Attorney, Agent, or Firm*—R. O. Nimtz; S. J. Phillips; G. L. Bush

[57] ABSTRACT

This invention is a method and apparatus for transfer of information on a screen by optical means onto a keyboard. The invention is implemented by displaying graphical or alpha-numeric information on a screen, such as a cathode-ray tube, and optically transferring that information to form an image on a keyboard, such as a pushbutton telephone keyboard, such that individual keys are labeled. The preferred optical means is a semitransparent mirror interposed between the keyboard and the user such that the screen image becomes a virtual image overlaying the keyboard.

16 Claims, 10 Drawing Figures

INTERACTIVE INPUT-OUTPUT COMPUTER TERMINAL WITH AUTOMATIC RELABELING OF KEYBOARD

BACKGROUND OF THE INVENTION

This invention is in the general field of computer terminals, but more specifically in the field of computer terminals including both a screen and a keyboard. The screen is used to display graphic or alpha-numeric information; the keyboard is used to input information into the computer.

Ordinary screen-keyboard terminals, enjoying wide commercial use today, do not provide optical transfer of information between screen and keyboard. These terminals provide the screen as an output device for the computer functionally similar to a typewriter output or to an off-line printer. The keyboard acts as an input device similar functionally to data cards, paper tape, or magnetic tape. Each key of the keyboard has a fixed meaning when depressed and a signal is sent to the computer.

It has been recognized that the 12 buttons of a pushbutton telephone set can serve as an input device to a computer over ordinary voice-grade telephone lines. The telephone set keyboard is presently being used to transfer funds from one account to another in a bank's computer. A template is placed over the keys of the TOUCH-TONE set so that the user can know the informational meaning for each button. This use is described in an article published in *Computer World*, Vol. VII, No. 28, p.2, July 11, 1973.

The pushbutton set has been used as an input device for a desk calculator in conjunction with a television screen and a computer. Calculations commanded on the pushbutton keyboard are performed in a computer and displayed on the television screen. This application is described in an article in the *Bell Labs Record*, Vol. 46, No. 6, June 1968 at p. 206.

It has been difficult to use a pushbutton telephone set as a computer input device, as in the above applications, because the number of keys is small, 12 or less. The small number of keys limits the informational meaning the keys can portray unless a way can be found to individually change their meaning depending on the particular computer application or program being used. There has been a need for a way to relabel keys of a computer input terminal such that they acquire different meanings, and the user can be made aware of those new meanings, for each program being used, or for different modes within the program.

U.S. Pat. No. 3,670,322, issued June 15, 1972, describes a "Programmable Keyboard" wherein each key of the keyboard is a small cathode-ray tube on which labels are generated under control of a computer. U.S. Pat. No. 3,187,321, issued June 1, 1965, describes an "Operator-Computer Communications Console" which is an interactive terminal with manual relabeling of a keyboard. A template is inserted over the keys which, when used with a particular mode of a computer program, allows the keys to have a unique meaning. U.S. Pat. No. 3,707,715, issued Dec. 16, 1972, describes a "Data Input Device" in which a portion of a cathode-ray tube is covered by a template with holes. Labels or symbols are generated on the CRT beneath the holes by a mode of a computer program. When a hole is obstructed (e.g., by a finger), a photo-detector connected to that hole in the template receives no light, and a signal is sent to the computer indicating an input from that hole. The device is a graphics screen (upper part of the CRT) relabeling keyboard.

Prior attempts at using a pushbutton pad of a telephone as a computer input device have been limited due to the small number of keys or buttons which can provide distinct input signals to a computer. Separate mechanical templates fitting over the pad have been necessary to provide information to the user sufficient to indicate distinct meanings of keys corresponding to different programs in a computer. The use of mechanical templates is very cumbersome when a user is trying to input information into a computer in which a wide variety of input is required.

The disadvantage of prior art reprogrammable keyboards has been with regard to their flexibility. A limiting factor of these prior art keyboards has been that information which could be automatically displayed on each key was limited by the size of the key itself. There has been no prior art solution to the problem of providing a reprogrammable non-mechanical way to provide graphical or alpha-numeric labels inside and outside the key area to give added flexibility in labeling the keys.

It is therefore an object of this invention to provide a computer input keyboard device such that the keys are automatically relabeled by optical transfer of computer generated graphical or alpha-numeric labels from a visual display device to the keyboard.

It is a more specific object of this invention to provide an inexpensive means to convert a pushbutton telephone set keyboard, in conjunction with a screen for electronically displaying graphical or alphanumeric information, into a relabelable computer input keyboard.

It is a still more specific object of this invention to provide a means for converting a visual telephone set into an automatically relabelable keyboard input device and graphical or alpha-numeric output device to be used in conjunction with a digital computer.

SUMMARY OF THE INVENTION

This invention is a method and apparatus for transfer of information on a screen by optical means onto a keyboard. The invention is implemented by displaying graphical or alpha-numeric information on a screen, such as a cathode-ray tube, and optically transfering that information to form an image on a keyboard, such as a pushbutton telephone keyboard, such that individual keys are labeled. The preferred optical means is a semitransparent mirror interposed between the keyboard and the user such that the screen image becomes a virtual image overlaying the keyboard.

Information on the screen can be generated by a computer operating under control of a stored computer graphics program. Information is input to the computer over a signal transmission path from the keyboard whereby signals generated by depressing the keys correspond to the labels optically transferred to the keyboard from the screen. Advantages of this invention include simplicity, low cost, and versatility when compared with prior art methods and apparatus for the automatic relabeling of a keyboard.

DETAILED DESCRIPTION

This invention pertains to a computer terminal wherein the keyboard of the terminal is automatically relabeled by optical transfer from a visual display device. The preferred embodiment includes a pushbutton telephone set which provides frequency signaling in its telephone function, but the invention includes the use of any computer input device which has a two-dimensional array of sensing elements. This array of sensing elements includes keys of a typewriter, wherein the depression of each key provides an electrical signal distinguishable from signals produced by all other keys. The array of sensing elements also includes an $x$–$y$ tablet of parallel $x$ and $y$ copper wires. Drawing on the tablet with a stylus, which has a tip capacitively coupled to the wires to which it is closest, generates stylus pulses uniquely representing the stylus position on the tablet.

The preferred output device is the cathode-ray screen of a television-telephone set but the invention includes the use of any computer output device wherein electronic information generated in a digital computer is displayed on a screen. These devices include not only ordinary television screens, (cathode-ray tubes) but also plasma arrays and arrays of light emitting diodes.

Figure 1:
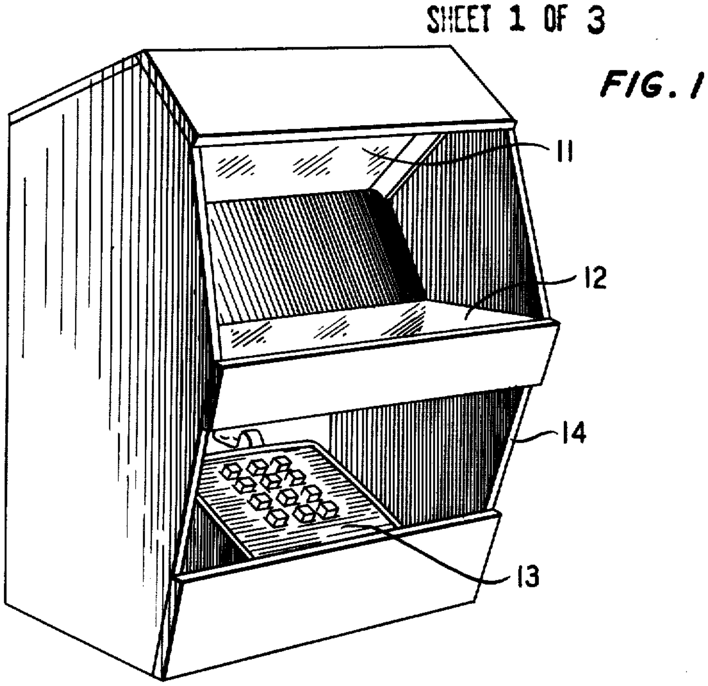
FIG. 1 shows the relative placement of the keyboard, visual display device, and means for optical transfer of information on the visual displace device to the keyboard.

The optical transfer means preferred in this invention is a semitransparent mirror interposed between the user and the keyboard of the input device to form a virtual image on the plane of the keyboard of graphical or alpha-numeric information displayed on the screen. FIG. 1 shows a cabinet 14 insuring the necessary relative placement of the screen 11, the semitransparent mirror 12, and the keyboard 13 of the pushbutton telephone set. These elements are placed within the cabinet 14 in order to provide proper lighting conditions and proper relative angular placement of screen, mirror and keyboard.

Figure 2:
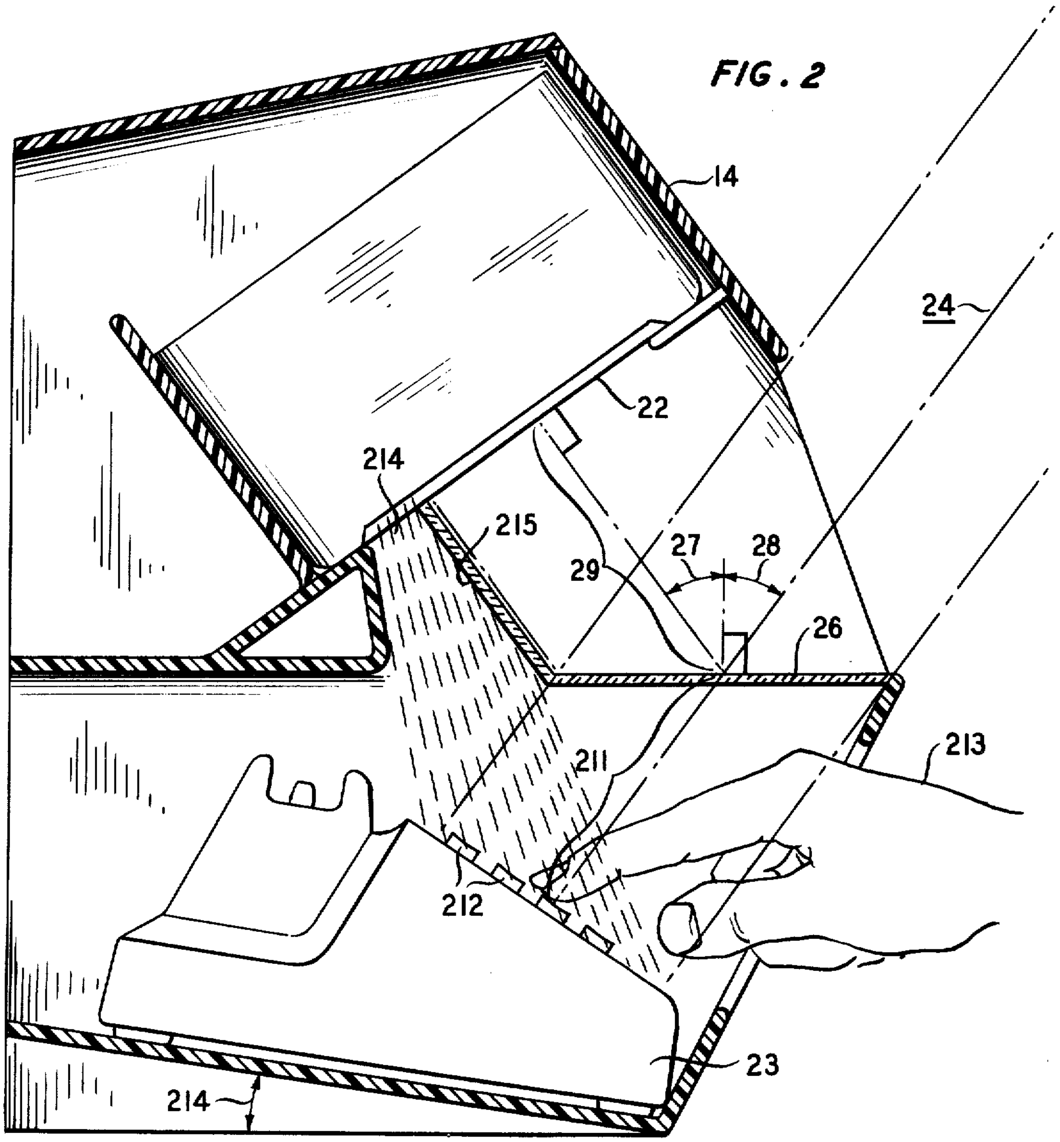
FIG. 2 shows in detail the construction of a cabinet to enclose a pushbutton telephone used as a keyboard, a visual display device, and a semitransparent mirror as a means for optical transfer.

FIG. 2 shows a detailed side view of the cabinet 14, screen 22, and pushbutton telephone set 23. The base of the cabinet is constructed such that the telephone set 23 is inclined with respect to the base of the cabinet. The angle of inclination 214 is such that the line of sight 24 is convenient to a user when the terminal is placed on a desk or table top in the usual application of this invention. The semitransparent mirror 26 and the face of the television screen 22 are placed within the cabinet, such that (1) the angle of incidence 27 to the mirror from a line perpendicular to the screen is equal to the angle of reflection 28 to the mirror from the line of sight 24 and (2) the center-line distance 29 from the screen to the mirror is equal to the center-line distance 211 from the plane of the keyboard to the mirror. Positioning the plane of the keyboard, the mirror and the screen in this manner creates to the viewer along the viewing line 24 a virtual image at the plane of the keyboard of the information displayed on the screen.

Figure 3:
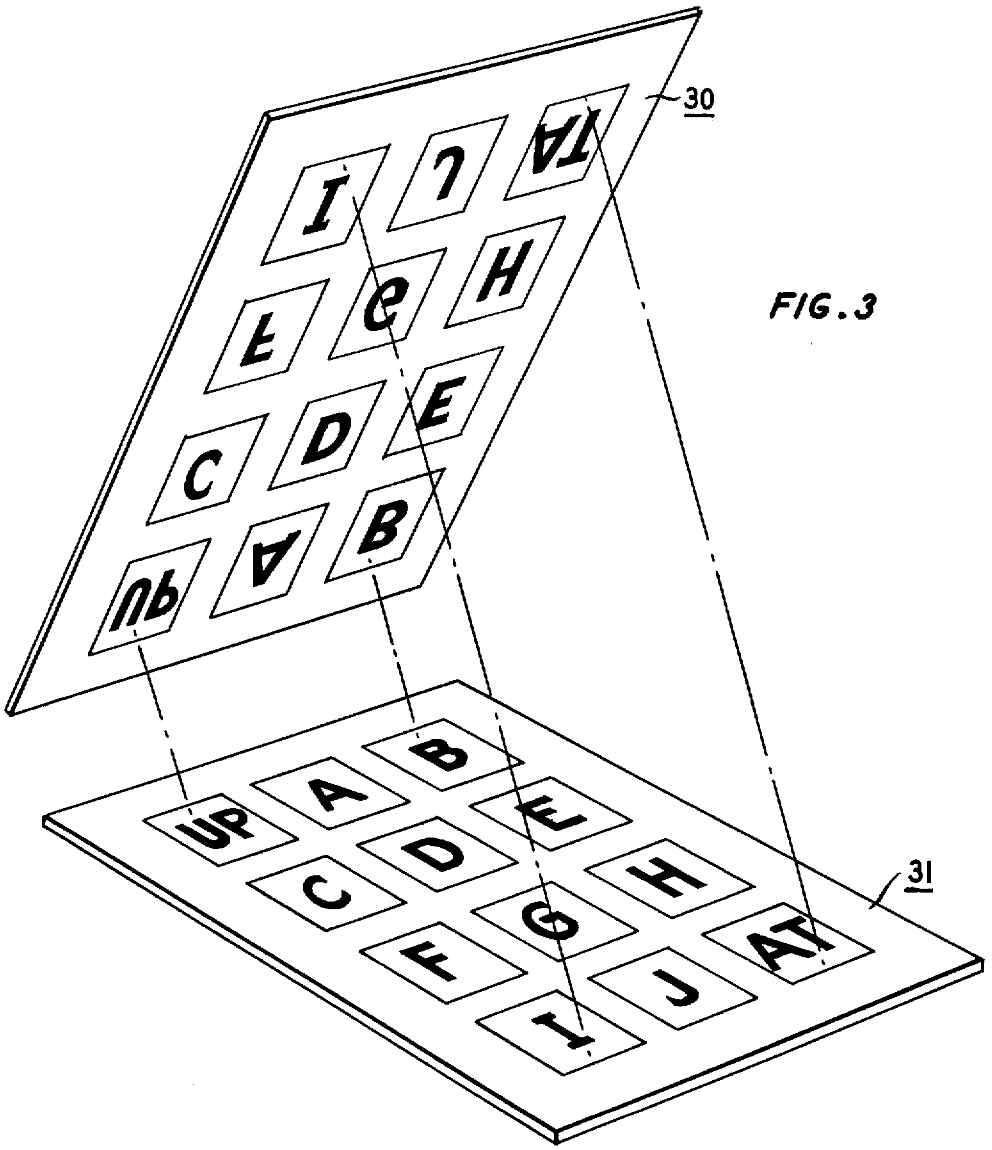
FIG. 3 shows how an image displayed in upside down fashion on the visual display device appears when seen through a semitransparent mirror.

The arrangement shown in FIG. 2 requires that graphical or alpha-numeric information be inverted so that the virtual image at the keyboard appears in the normal right-side-up fashion. FIG. 3 illustrates that every point in the display 30 on the screen is inverted by the mirror such that the desired labels on the keyboard of the telephone set below appear as in the display 31. By using an arrangement whereby the image is first reflected by a mirror and that reflection is reflected again by a second mirror would allow the information displayed on the screen to be right-side-up, but the arrangement shown in FIG. 2 is the preferred arrangement of the screen and keyboard since upside down displays are easily achieved with computer graphics techniques.

It is desirable that the semitransparent mirror reflects the image displayed on the screen, while allowing the user to faintly see his hand 213 while he is using the keyboard. A unique feature of this invention is that since the labels are actually seen at the mirror, the user's hand does not obscure the labeling of the keys.

In order that sufficient light be present to illuminate the user's hand, the bottom portion of the screen 214 shown in FIG. 2 is brightened under program control logic of the associated digital computer. The light of the screen with the aid of the reflecting mirror 215 casts illumination on the keyboard. An alternative to using the bottom of the screen for illumination is to provide a separate light source, in the same relative position as the bottom of the screen 214 and controlled by the computer graphics logic of the digital computer. With no light in the darkened keyboard area, the user's hand disappears and the user obtains a mirror view only of the computer generated image on the screen.

A mirror which allows approximately 45 percent of light to be transmitted through it while reflecting approximately 45 percent of light on it throughout the visible spectrum is appropriate for this invention. It is desirable to coat the mirror on the back with a magnesium flouride anti-reflective coating to prevent reflections of the screen image from the keyboard surface.

Because the image on a television screen changes slightly during warmup after it is initially turned-on, it is desirable to be able to change the position of the telephone keyboard slightly. For that reason, the telephone instrument 13 in FIG. 1 is free to be moved by the user to achieve proper alignment of labels displayed on the screen 11 and viewed through the semitransparent mirror 12.

Figure 4:
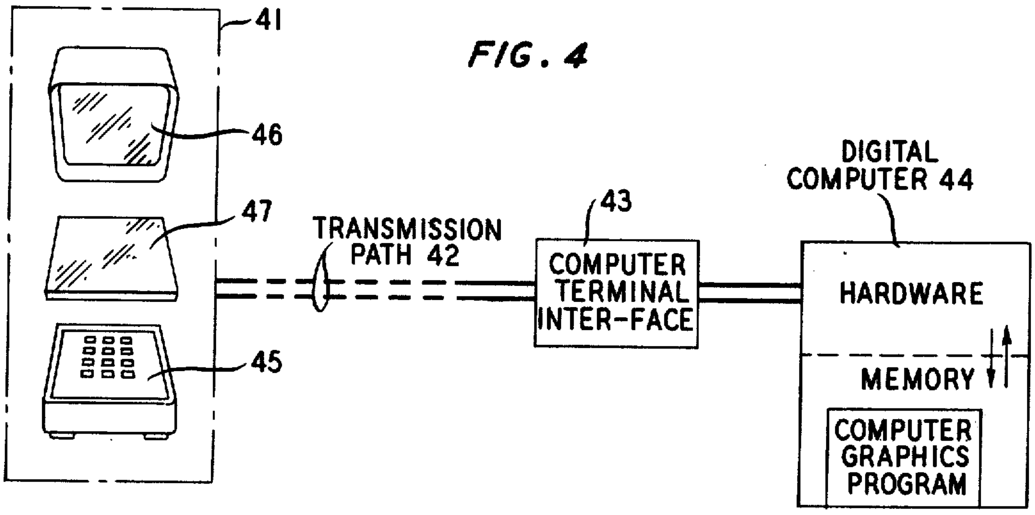
FIG. 4 shows a computer system including input-output terminal with a reprogrammable keyboard.

FIG. 4 shows a functional diagram of a complete computer system wherein an automatic keyboard relabeling input-output terminal serves as the device whereby the operator receives and inputs information to a digital computer. The diagram shows the terminal, a transmission path 42 from the terminal to the computer, a computer terminal interface 43 and a digital computer 44.

The transmission path can be a simple voice grade telephone circuit as far as transmitting frequency signals which result from depressing the buttons of the pushbutton telephone set. The frequency characteristics of the transmission path returning from the computer to the screen depend on the type of screen and the speed with which information is to be displayed on the screen. For example, if the screen is a commercial television screen, the transmission path must be capable of carrying a signal whose bandwidth is 4 MHz. If the screen is a television screen used in the television-telephone set the transmission path is required to have a bandwidth of 1 MHz. Other screens can be used, e.g., a plasma array, where information is not required to be continuously transmitted as with a television screen, but information is only transmitted which is needed to change a portion of the display. Transmitting information which changes only a portion of an existing display, can be achieved with using a standard 4 KHz telephone circuit, but display changes must be slower than with the use of a television screen and its required 4 MHz transmission path.

The computer-terminal interface 43 is used to convert input frequency signals to digital signals appropriate for recognition in a digital computer. Such interface equipment is well known in the telephone signaling art, since pushbutton telephones are used to provide different frequency signals which are translated into digital signals representing telephone numbers.

The digital computer 44 in FIG. 4 represents any stored program, general purpose computer such as the IBM 1130. Stored in the memory of the computer is a computer graphics program capable of generating signals for the transmission to a display device representing graphical or alpha-numberic information. A particular visual display device, the IBM 2250, can be accessed by a main program calling a subroutine presented in its entirety in IBM 1130 assembler language at pages 72–92 of *A Conversational Graphic Data Processing System: The IBM* 1130/2250, W. H. Desmonde, Prentice-Hall, Inc., Englewood Cliffs, N.J., 1969. The book by Mr. Desmonde gives detailed instructions on how to program an IBM 1130 to achieve graphical and alpha-numeric displays on the IBM 2250 visual display device. Another text, *Principles of Interactive Computer Graphics*, W. M. Newman and R. F. Sproull, McGraw-Hill, New York, N.Y., 1973, extensively describes the present state of the art in computer programming methods in general, not specific to IBM equipment. A computer program used to produce graphical displays on a visual display device is disclosed in U.S. Pat. No. 3,389,404, issued to R. A. Koster. Another patent, U.S. Pat. No. 3,609,670, issued to the applicant, discloses a computer program for use in an IBM 7090 for generating signals representing graphical information.

As an example of the use of this invention, FIG. 5 shows in a sequence of sketches, how graphical patterns can be constructed by the disclosed system. It is assumed that a computer graphics program is stored in a digital computer which is connected by a transmission path to the interactive computer terminal.

Figure 5A:
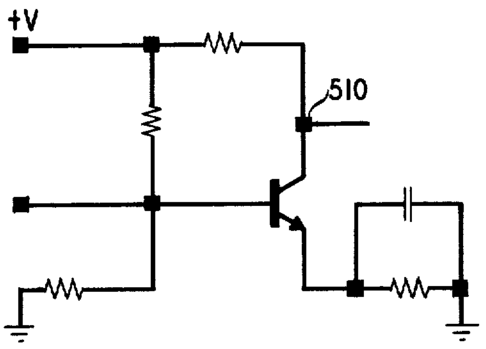
FIGS. 5A–5F show a sequence of displays and labels as an example of how the computer system might be used.

FIG. 5A appears as a virtual image overlaying the terminal keyboard while the user pushes one of the buttons. By releasing that button the program produces the display reproduced in FIG. 5B.

Figure 5B:
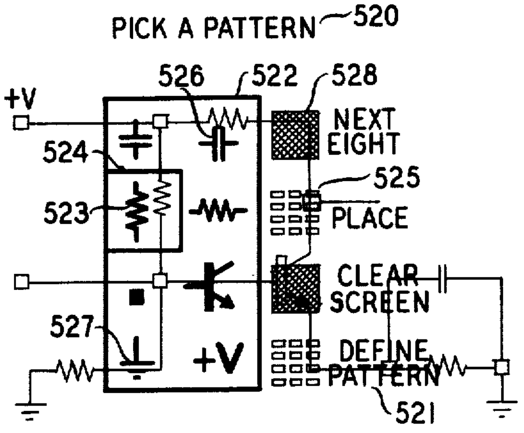
Figure 5C:
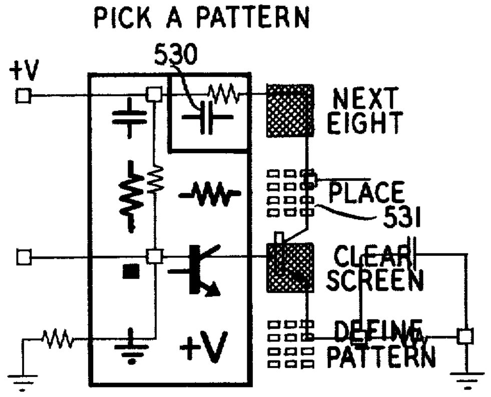

The three by four array of buttons of FIG. 5B are labeled by superimposing different graphical symbols, and alphabetic labels to give meaning to the buttons. For example, the first column, fourth row button is labeled with the ground symbol 527; the third column, first row button is labeled with cross-hatching 528. The electrical circuit diagram which the user is constructing is visible, although displayed with less intensity than in FIG. 5A. FIG. 5B shows that the display has a title PICK A PATTERN 520, specific labels such as DEFINE PATTERN 521 which give meaning to the third column of buttons, and a rectangle 522 enclosing buttons labeled with various electrical symbols. A particular button 523 is enclosed with another rectangle 524 to indicate to the user that the vertical resistor symbol will be placed on the electrical schematic if the PLACE button is pushed. Assume the user needs a horizontal capacitor 526; he pushes that button and FIG. 5C is the result. By pushing the horizontal capacitor button he has moved the small rectangle to the horizontal capacitor button 530.

The user can place the capacitor on the circuit by pushing the PLACE button 531. Another display, FIG. 5D, appears overlaying the keyboard.

Figure 5D:
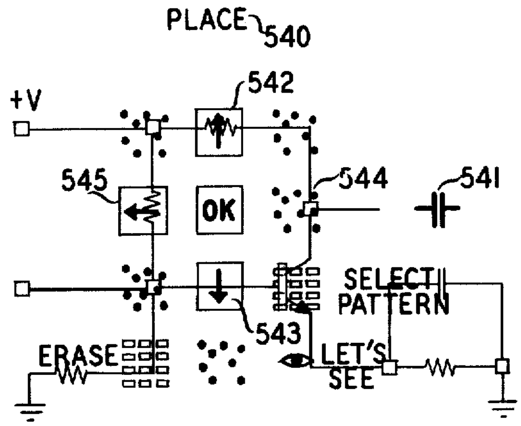

The FIG. 5D display has a title, PLACE 540 and labels on the buttons. Not all of the buttons are needed to provide information to the graphics program; those not needed are labeled with dots to obscure the labeling on the buttons of the telephone set. The new element selected, the horizontal capacitor 541, appears on the right hand side of the display. The new element in this PLACE mode can be positioned by pushing the buttons labeled with up 542, down 543, right 544 or left 545 arrows. Because the capacitor 541 is to the extreme right of the display, and cannot be moved farther right, the right arrow button 544 has its label removed and replaced with dots.

Figure 5E:
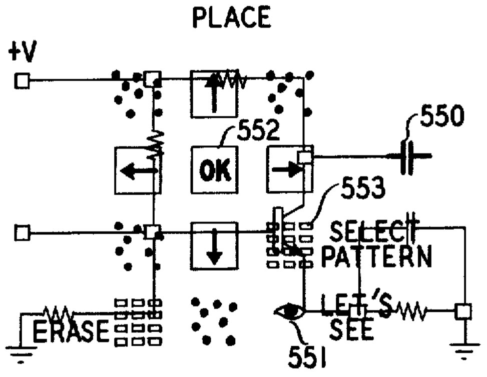
Figure 5F:
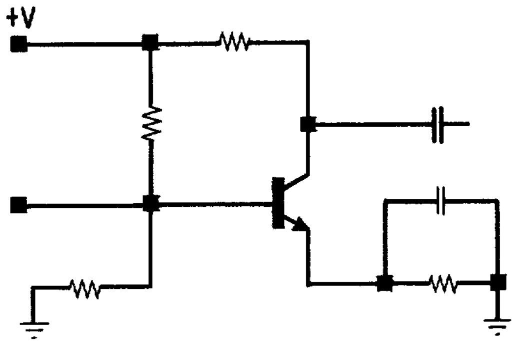

Pushing the left button 545 one time produces the result in FIG. 5E. The capacitor 550 is now aligned with the circuit in the proper way. Pushing the OK button 552 of FIG. 5E will fix the capacitor to the schematic. Then pushing and holding the LET'S SEE button 551 produces FIG. 5F which shows the completed circuit. The PICK A PATTERN mode of FIG. 5B is achieved by pushing the SELECT PATTERN button 553 of FIG. 5E.

What is claimed is:

1. A computer input-output device comprising:

a visual display device for displaying graphical or alpha-numeric images;

a keyboard containing at least one manually operated key; and optical means for producing virtual images from said visual display device upon said keyboard.

2. The computer input-output device of claim 1 wherein said optical means consists of a semi-transparent mirror for reflecting said graphical or alpha-numeric information displayed on said visual display device to virtually appear to the user to be superimposed upon said keyboard.

3. The computer input-output device of claim 2 wherein said semi-transparent mirror creates the simultaneous image of (1) graphical or alpha-numeric information reflected from said visual display device and (2) the user's hand when at the keyboard.

4. The computer input-output device of claim 1 wherein said visual display device for displaying computer output signals in graphical or alpha-numeric form is a cathode-ray tube.

5. The computer input-output device of claim 1 wherein said visual display device for displaying computer output signals in graphical or alpha-numeric form is a plasma panel array.

6. The computer input-output device of claim 1 wherein said visual display device for displaying computer output signals in graphical or alpha-numeric form is an array of light emitting diodes.

7. The computer input-output device of claim 1 wherein said keyboard is a pushbutton pad of a pushbutton telephone set.

8. The computer input-output device of claim 1 wherein said keyboard is a typewriter keyboard.

9. The computer input-output device of claim 1 wherein said keyboard is an $x$–$y$ tablet and stylus.

10. The computer input-output device of claim 1 wherein said visual display for displaying computer output signals in graphical or alpha-numeric form is a television screen of a television-telephone set and said keyboard is a pushbutton pad of said television-telephone set.

11. An interactive computer system comprising:

a digital computer which has stored in memory a program for the generation of a plurality of signals representing graphical or alpha-numeric information;

a transmission path for signals to and from said digital computer and an input-output terminal;

a visual display device of said input-output terminal responsive to said signals representing graphical or alpha-numeric information for displaying said information;

a keyboard of said input-output terminal consisting of an array of keys, each of said keys when depressed producing a signal for use as input information to said digital computer; and means for reflecting said information displayed on said visual display device to create a virtual image overlaying said keyboard.

12. The method of automatically relabeling the keyboard of a screen-keyboard computer terminal by 1. generating graphical or alpha-numeric signal information in a digital computer,
2. displaying such information to form graphical or alpha-numeric images on said screen,
3. reflecting the images displayed on the screen by means of a semitransparent mirror to form virtual images overlaying the keyboard, and
4. coupling said keyboard to said digital computer by providing
   (1) a signal path from keyboard to computer
   (2) a signal converter to change keyboard signals created by a depressed key into signals useful in a digital computer
   (3) a computer program responsive to said signals as indicators of user responses to said virtual images overlaying said keyboard.

13. A cabinet for a computer terminal of the type having a visual display device and a keyboard comprising, 1. means for supporting a keyboard and a visual display device,
2. a first opening for viewing said keyboard through a semitransparent mirror,
3. means for securing said semitransparent mirror such that images displayed on said visual display device appear as virtual images superimposed on the plane of said keyboard when viewed through said first opening, and
4. a second opening for the insertion of the operator's hand to manipulate the keyboard.

14. A cabinet as set forth in claim 13 further comprising:

a partition for directing illumination produced by a brightened portion of said visual display device away from said semitransparent mirror and toward said keyboard.

15. A cabinet as set forth in claim 14 wherein said partition further includes a reflecting mirror for further directing said illumination toward said keyboard.

16. A computer input-output device as set forth in claim 1 further comprising:

means for illuminating said keyboard with a brightened portion of said visual display device.

* * * * *